United States Patent
Yamasaki et al.

(10) Patent No.: US 12,097,891 B2
(45) Date of Patent: Sep. 24, 2024

(54) VEHICLE CONTROL DEVICE, VEHICLE CONTROL METHOD, AND VEHICLE CONTROL SYSTEM

(71) Applicant: SUBARU CORPORATION, Tokyo (JP)

(72) Inventors: Tsuyoshi Yamasaki, Tokyo (JP); Fumiya Sato, Tokyo (JP); Hideyuki Takao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 459 days.

(21) Appl. No.: 16/795,995

(22) Filed: Feb. 20, 2020

(65) Prior Publication Data
US 2020/0307645 A1 Oct. 1, 2020

(30) Foreign Application Priority Data
Mar. 27, 2019 (JP) ................. 2019-060785

(51) Int. Cl.
*B60W 60/00* (2020.01)
*B60W 30/04* (2006.01)
(Continued)

(52) U.S. Cl.
CPC ........ *B60W 60/0057* (2020.02); *B60W 30/04* (2013.01); *B60W 40/068* (2013.01);
(Continued)

(58) Field of Classification Search
CPC ......... B60W 60/0057; B60W 60/0059; B60W 60/0053; B60W 30/04; B60W 40/068;
(Continued)

(56) References Cited

U.S. PATENT DOCUMENTS 9,815,476 B2 * 11/2017 Lynch ................. B60W 40/064
11,027,608 B2 * 6/2021 Kojima ............. B60W 60/0053
(Continued)

FOREIGN PATENT DOCUMENTS

| CN | 107943046 B | * | 9/2021 | ........... G05D 1/0214 |
| CN | 108803322 B | * | 11/2021 | ........... G05B 13/042 |

(Continued)

OTHER PUBLICATIONS

"Dogan, Ebru et al.; Transition of control in a partially automated vehicle: Effects of anticipation and non-driving-related task involvement; Elsevir; Transportation Research Part F; Mar. 2, 2017" (Year: 2017).*

(Continued)

*Primary Examiner* — Russell Frejd
*Assistant Examiner* — Christopher R Cardimino
(74) *Attorney, Agent, or Firm* — TROUTMAN PEPPER HAMILTON SANDERS LLP

(57) ABSTRACT

A vehicle control device includes a behavior instability acquirer, an automated driving advisability determination unit, and a switching time setting unit. The behavior instability acquirer acquires behavior instability of a vehicle. The automated driving advisability determination unit determines whether to continue automated driving on the condition that the vehicle is performing the automated driving. On the condition that the automated driving advisability determination unit determines that the automated driving is noncontinuable, the switching time setting unit determines switching time from the automated driving to manual driving on the basis of the behavior instability.

10 Claims, 9 Drawing Sheets

(51) Int. Cl.
 *B60W 40/068* (2012.01)
 *B60W 50/00* (2006.01)
 *B60W 50/14* (2020.01)

(52) U.S. Cl.
 CPC ........ *B60W 50/14* (2013.01); *B60W 60/0053* (2020.02); *B60W 60/0059* (2020.02); *B60W 2050/0072* (2013.01); *B60W 2050/0075* (2013.01); *B60W 2552/40* (2020.02); *B60W 2556/10* (2020.02)

(58) Field of Classification Search
 CPC ............. B60W 50/14; B60W 2556/10; B60W 2552/40; B60W 2050/0072; B60W 2050/0075; B60W 2050/143; B60W 2556/45; B60W 2552/35; B60W 2555/20; B60W 2520/10
 See application file for complete search history.

(56) References Cited

U.S. PATENT DOCUMENTS

| | | | | |
|---|---|---|---|---|
| 11,466,998 | B1* | 10/2022 | Williams | ........... G06Q 10/0635 |
| 2014/0156133 | A1 | 6/2014 | Cullinane et al. | |
| 2014/0156134 | A1 | 6/2014 | Cullinane et al. | |
| 2014/0303827 | A1* | 10/2014 | Dolgov | ................. B60W 30/00 701/23 |
| 2014/0330478 | A1 | 11/2014 | Cullinane et al. | |
| 2015/0253778 | A1* | 9/2015 | Rothoff | ............. G01C 21/3697 701/25 |
| 2015/0284009 | A1 | 10/2015 | Cullinane et al. | |
| 2016/0200326 | A1 | 7/2016 | Cullinane et al. | |
| 2017/0043788 | A1 | 2/2017 | Cullinane et al. | |
| 2017/0253253 | A1 | 9/2017 | Cullinane et al. | |
| 2017/0364070 | A1* | 12/2017 | Oba | .................. B60W 60/0059 |
| 2018/0043904 | A1 | 2/2018 | Cullinane et al. | |
| 2018/0334173 | A1 | 11/2018 | Cullinane et al. | |
| 2019/0291746 | A1 | 9/2019 | Cullinane et al. | |
| 2020/0180660 | A1 | 6/2020 | Honda | |
| 2021/0016805 | A1* | 1/2021 | Oba | ......................... G06T 3/00 |
| 2021/0129857 | A1 | 5/2021 | Cullinane et al. | |
| 2021/0370983 | A1* | 12/2021 | Oba | ...................... B60W 50/16 |

FOREIGN PATENT DOCUMENTS

| | | |
|---|---|---|
| JP | H10309961 A | 11/1998 |
| JP | 2016-115356 A | 6/2016 |
| JP | 2018106757 A | 7/2018 |
| JP | 2018149934 A | 9/2018 |
| WO | 2018230174 A1 | 12/2018 |
| WO | 2019043916 A1 | 3/2019 |

OTHER PUBLICATIONS

"Mok, Brian et al.; Emergency, Automation Off: Unstructured Transition Timing for Distracted Drivers of Automated Vehicles; Stanford University; 2015 IEEE 18th international conference on intelligent transportation systems; 2015" (Year: 2015).*

Japanese Office Action issued in Application No. JP2019-060785; mailed Oct. 25, 2022; 5 pages.

The Second Office Action issued in Chinese Patent Application No. 202010115526.X dated Jun. 21, 2024, with machine translation.

* cited by examiner (1)

(2)

(3)

| ROAD SURFACE CONDITIONS | | DRY | | WET | |
|---|---|---|---|---|---|
| | SPEED km/h | EQUAL TO OR LOWER THAN 50 km/h | EQUAL TO OR HIGHER THAN 50 km/h | EQUAL TO OR LOWER THAN 50 km/h | EQUAL TO OR HIGHER THAN 50 km/h |
| ASPHALT | NEW PAVING | 0.82~1.02 | 0.67~0.72 | 0.52~0.82 | 0.47~0.77 |
| | NORMAL PAVING | 0.62~0.82 | 0.57~0.72 | 0.47~0.72 | 0.42~0.67 |
| | ABRASED PAVING | 0.57~0.77 | 0.47~0.67 | 0.47~0.67 | 0.42~0.62 |
| | EXCESS OF TAR | 0.52~0.62 | 0.37~0.62 | 0.32~0.62 | 0.27~0.57 |
| CONCRETE | NEW PAVING | 0.82~1.02 | 0.72~0.87 | 0.52~0.82 | 0.42~0.77 |
| | NORMAL PAVING | 0.62~0.82 | 0.62~0.77 | 0.47~0.72 | 0.47~0.67 |
| | ABRASED PAVING | 0.57~0.77 | 0.52~0.67 | 0.47~0.67 | 0.47~0.62 |
| GRAVEL | SIMPLE PAVING | 0.57~0.87 | 0.52~0.82 | 0.42~0.82 | 0.42~0.62 |
| | FINE GRAVEL | 0.46~0.72 | 0.42~0.72 | 0.47~0.77 | 0.47~0.77 |
| ICE | SMOOTH SURFACE | 0.12~0.27 | 0.09~0.22 | 0.07~0.12 | 0.02~0.12 |
| | HARD | 0.32~0.57 | 0.02~0.37 | 0.32~0.62 | 0.02~0.62 |
| SNOW | FRESH SNOW | 0.12~0.27 | 0.12~0.22 | 0.32~0.62 | 0.02~0.62 |
| | HARDENED | 0.32~0.57 | 0.37~0.57 | 0.32~0.62 | 0.32~0.62 |

FIG. 3

| SCORING OF DATA | | DISTANCE AHEAD OF OWN VEHICLE (km) | | |
|---|---|---|---|---|
| | | 1.0 | 5.0 | 10.0 |
| PRESENT DATA ON SURROUNDINGS | WEATHER | 1 | | |
| | TEMPERATURE | 0 | | |
| | WIND FORCE | 1 | | |
| | ROAD SURFACE STATE | 0 | | |
| PAST DATA IN CLOUD | WEATHER | 1 | 1 | 1 |
| | TEMPERATURE | 0 | 1 | 1 |
| | WIND FORCE | 1 | 1 | 1 |
| | ROAD SURFACE STATE | 0 | 3 | 3 |
| DIFFERENCE BETWEEN PRESENT AND PAST | WEATHER | 0 | 0 | 0 |
| | TEMPERATURE | 0 | -1 | -1 |
| | WIND FORCE | 0 | 0 | 0 |
| | ROAD SURFACE STATE | 0 | -3 | -3 |
| AUTOMATED DRIVING ADVISABILITY | | CONTINUABLE | NONCONTINUABLE | NONCONTINUABLE |

FIG. 5

| TEMPERATURE °C | SCORE | | ROAD SURFACE STATE | SCORE |
|---|---|---|---|---|
| t ≥ 5.0 | 0 | | DRY | 0 |
| 0.0 ≤ t < 5.0 | 1 | | WET | 1 |
| -5.0 < t < 0.0 | 2 | | SNOW | 2 |
| t ≤ -5.0 | 3 | | ICE | 3 |

| WIND FORCE | 0 | 1 | 2 | 3 | 4 | 5 | 6 | 7 | 8 | 9 | 10 | 11 | 12 |
|---|---|---|---|---|---|---|---|---|---|---|---|---|---|
| SCORE | 0 | | | 1 | | 2 | | | 3 | | | | |

| WEATHER | SCORE |
|---|---|
| FINE | 0 |
| CLOUDY | 1 |
| RAIN | 2 |
| SNOW | 3 |

FIG. 6

| CALCULATED COEFFICIENT OF FRICTION | COEFFICIENT OF SWITCHING TIME |
|---|---|
| 1.0 | 1.0 |
| 0.9 | 1.0 |
| 0.8 | 1.0 |
| 0.7 | 1.0 |
| 0.6 | 1.0 |
| 0.5 | 1.2 |
| 0.4 | 1.2 |
| 0.3 | 1.4 |
| 0.2 | 1.4 |
| 0.1 | 1.6 |
| 0.0 | 1.6 |

VEHICLE CONTROL DEVICE, VEHICLE CONTROL METHOD, AND VEHICLE CONTROL SYSTEM

CROSS-REFERENCE TO RELATED APPLICATIONS

This application claims priority from Japanese Patent Application No. 2019-060785 filed on Mar. 27, 2019, the entire contents of which are hereby incorporated by reference.

BACKGROUND

The technology relates to a vehicle control device, a vehicle control method, and a vehicle control system.

An automated steering control includes guiding an own vehicle to travel along a target traveling lane. In a case where a driver makes a steering operation in the course of the automated steering control, or on traveling conditions such as a case of travel on a road having a low coefficient of friction, however, maintaining the automated steering control may cause disadvantages such as the sense of incongruity about the steering operation or instable vehicle behavior. For example, Japanese Unexamined Patent Application Publication (JP-A) No. 2016-115356 discloses a technique intended for elimination of such disadvantages.

SUMMARY

An aspect of the technology provides a vehicle control device including a behavior instability acquirer, an automated driving advisability determination unit, and a switching time setting unit. The behavior instability acquirer is configured to acquire behavior instability of a vehicle. The automated driving advisability determination unit is configured to determine whether to continue automated driving on the condition that the vehicle is performing the automated driving. The switching time setting unit is configured to determine switching time from the automated driving to manual driving on the basis of the behavior instability, on the condition that the automated driving advisability determination unit determines that the automated driving is noncontinuable.

An aspect of the technology provides a vehicle control method including: acquiring behavior instability of a vehicle on the basis of data detected by a sensor; determining whether to continue automated driving on the condition that the vehicle is performing the automated driving; and determining switching time from the automated driving to manual driving on the basis of the behavior instability, on the condition that a determination is made that the automated driving is noncontinuable.

An aspect of the technology provides a vehicle control system including a vehicle control device and a server. The server is configured to accumulate data regarding environment around a proposed route to be traveled by a vehicle and provide the vehicle control device with the data regarding the environment around the proposed route. The vehicle control device includes a behavior instability acquirer, an automated driving advisability determination unit, and a switching time setting unit. The behavior instability acquirer is configured to acquire behavior instability of the vehicle. The automated driving advisability determination unit is configured to determine whethert to continue automated driving on the basis of data regarding surrounding environment around the vehicle and on the basis of the data regarding the environment around the proposed route. The switching time setting unit is configured to determine switching time from the automated driving to manual driving on the basis of the behavior instability, on the condition that the automated driving advisability determination unit determines that the automated driving is noncontinuable.

An aspect of the technology provides a vehicle control device including circuitry. The circuitry is configured to acquire behavior instability of a vehicle. The circuitry is configured to determine whether to continue automated driving on the condition that the vehicle is performing the automated driving. The circuitry is configured to determine switching time from the automated driving to manual driving on the basis of the behavior instability, on the condition that a determination is made that the automated driving is noncontinuable.

An aspect of the technology provides a vehicle control system including circuitry and a server. The server is configured to accumulate data regarding environment around a proposed route to be traveled by a vehicle and provide the circuitry with the data regarding the environment around the proposed route. The circuitry is configured to acquire behavior instability of the vehicle. The circuitry is configured to determine whether to continue automated driving on the basis of data regarding surrounding environment around the vehicle and on the basis of the data regarding the environment around the proposed route. The circuitry is configured to determine switching time from the automated driving to manual driving on the basis of the behavior instability, on the condition that a determination is made that the automated driving is noncontinuable.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 schematically illustrates an example of a database that defines, in advance, relation of road surface conditions and a coefficient of friction.

FIG. 5 summarizes data obtained by scoring.

FIG. 6 schematically illustrates a table to be referred to in the scoring.

DETAILED DESCRIPTION

Figure 1:
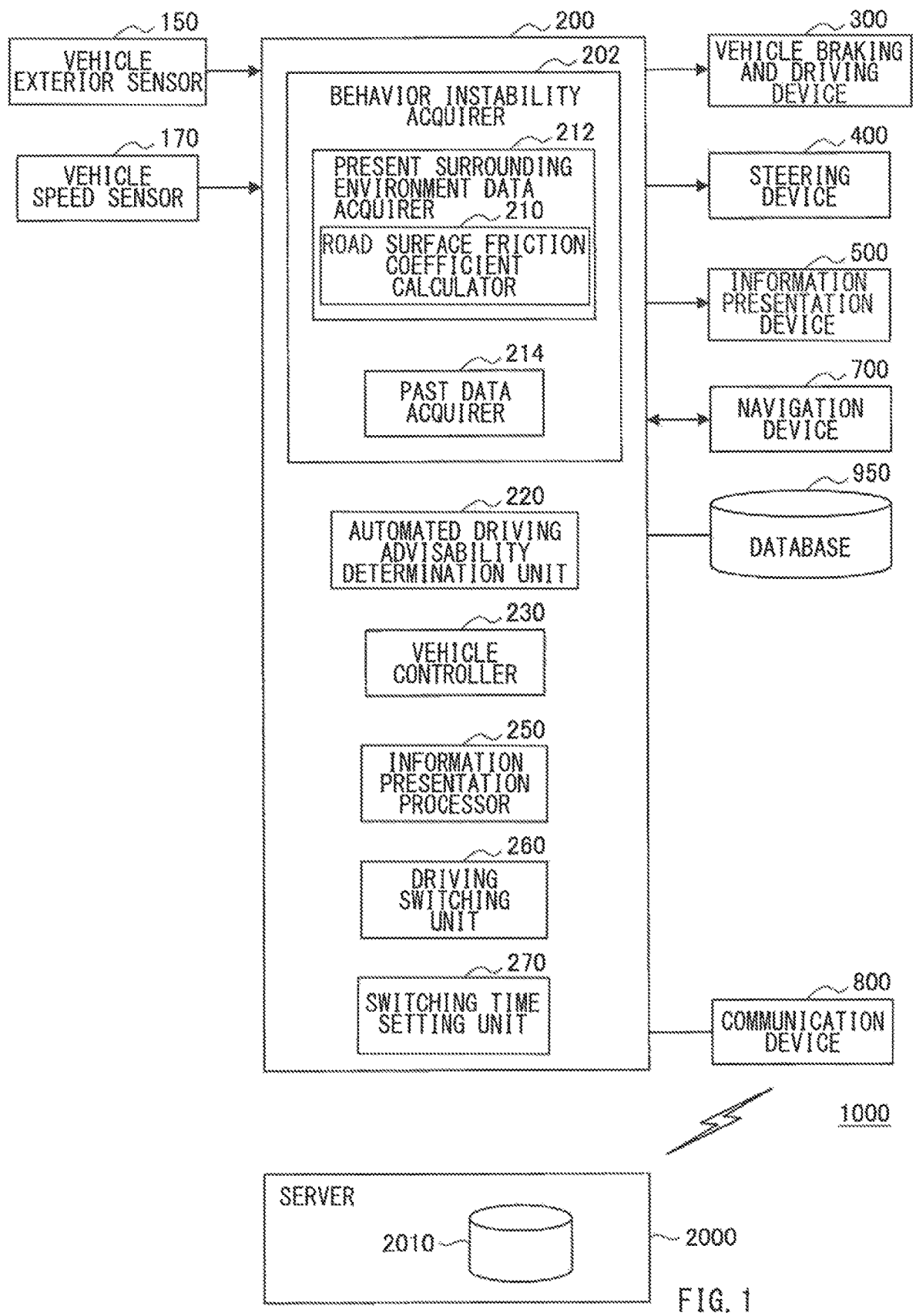
FIG. 1 schematically illustrates a configuration of a vehicle system according to an embodiment of the technology.

With the widespread use of automobiles capable of automated driving, many situations are assumed to arise where switching from the automated driving to manual driving occurs. In such situations, instantaneous switching from the automated driving to the manual driving would bring about cases where an occupant cannot cope with the manual driving, resulting in possibility of instable vehicle behavior caused by a driver's abrupt operation. Further, in terms of processing on the vehicle side, the switching from the automated driving to the manual driving involves a preparation period from a start of the switching to an end of the switching. JP-A No. 2016-115356 takes little consideration of transition time to be involved in the switching from the automated driving to the manual driving.

It is desirable to provide a vehicle control device, a vehicle control method, and a vehicle control system that make it possible to stabilize vehicle behavior in switching from automated driving to manual driving.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and drawings, elements having substantially the same function and configuration are denoted with the same reference characters to avoid redundant description, and elements not in direct relation to the technology may not be illustrated.

Described first, with reference to FIG. 1, is a configuration of a vehicle system 1000 according to an embodiment of the technology. The vehicle system 1000 may be mounted on a vehicle such as an automobile. In this embodiment, the vehicle on which the vehicle system 1000 is mounted may be a vehicle that is able to perform automated driving and manual driving. As illustrated in FIG. 1, the vehicle system 1000 according to this embodiment may include a vehicle exterior sensor 150, vehicle speed sensor 170, a control device 200, a vehicle braking and driving device 300, a steering device 400, an information presentation device 500, a navigation device 700, a communication device 800, and a database 950. The vehicle system 1000 is able to communicate with an external server 2000.

The control device 200 may perform an overall control of the vehicle system 1000. The control device 200 may include a behavior instability acquirer 202, an automated driving advisability determination unit 220, a vehicle controller 230, an information presentation processor 250, a driving switching unit 260, and a switching time setting unit 270. It is to be noted that the components of the control device 200 illustrated in FIG. 1 may include a circuit, i.e., hardware, or a central processing unit such as a CPU, and a program, i.e., software, that causes the central processing unit to operate.

The vehicle exterior sensor 150 may include, for example but not limited to, a camera, a temperature sensor, a near-infrared sensor, millimeter wave radar, laser radar, i.e., LiDAR, a laser light sensor, i.e., a Time of Flight (TOF) sensor, and a wind force sensor. The camera may capture an image frontward of the vehicle. Non-limiting examples of the temperature sensor may include an outside air temperature sensor and a road surface temperature sensor. The vehicle exterior sensor 150 may detect environmental data such as the image, a temperature, a road surface state frontward of the vehicle. It is to be noted that in determining the road surface state by the vehicle exterior sensor 150, employed may be a method described in, for example, JP-A No. 2006-46936.

The vehicle braking and driving device 300 may perform braking and driving of the vehicle. In one specific but non-limiting example, the vehicle braking and driving device 300 may include, for example but not limited to, a motor, an engine, e.g., an internal combustion engine, and a frictional brake that drive a wheel of the vehicle and generate electric power by regeneration. The steering device 400 may perform steering of, mainly, a front wheel of the vehicle by a steering operation. The steering device 400 is able to perform the steering of the front wheel by driving force of an actuator.

The information presentation device 500 may include, for example but not limited to, a display and a speaker that are installed in the vehicle. The information presentation device 500 may provide an occupant of the vehicle with, for example but not limited to, presentation of information that indicates switching from the automated driving to the manual driving, on the basis of an instruction from the information presentation processor 250.

The communication device 800 may communicate with the server 2000 outside the vehicle, to transmit and receive various kinds of data. The navigation device 700 may search for a proposed route from a present location to a destination, on the basis of map data. For this purpose, the navigation device 700 is able to acquire a present position of the vehicle by a satellite positioning system such as a Global Positioning System (GPS). Moreover, the navigation device 700 may hold a route traveled by the vehicle to the present location.

The behavior instability acquirer 202 of the control device 200 may include a present surrounding environment data acquirer 212 and a past data acquirer 214. The present surrounding environment data acquirer 212 may acquire data regarding present surrounding environment around the vehicle. The past data acquirer 214 may acquire data regarding past surrounding environment from the server 2000. The present surrounding environment data acquirer 212 may also include a road surface friction coefficient calculator 210. The road surface friction coefficient calculator 210 may calculate a coefficient of friction on a road surface.

In one embodiment of the technology, the coefficient of friction on the road surface may serve as "behavior instability".

The present surrounding environment data acquirer 212 may acquire, on the basis of data detected by the vehicle exterior sensor 150, data such as weather, an air temperature, wind force, and the road surface state around the vehicle. Non-limiting examples of the road surface state may include dry, wet, and frozen, i.e., ice. It is to be noted that the weather around the vehicle may be acquired on the basis of an image of the sky captured by the vehicle exterior sensor 150. These pieces of data acquired by the present surrounding environment data acquirer 212 may be transmitted to the server 2000 through the communication device 800 together with positional data of the vehicle, and held in a database 2010 of the server 2000. This makes it possible for other vehicles accessing the server 2000 to acquire and use these pieces of data.

When the vehicle exterior sensor 150 detects, for example, the image and the temperature frontward of the vehicle, the road surface friction coefficient calculator 210 may calculate, in real time, the coefficient of friction on the road surface on the basis of, for example, the image and the temperature frontward of the vehicle detected by the vehicle exterior sensor 150. In one specific but non-limiting example, the road surface friction coefficient calculator 210 may acquire, for example, a color of the road surface frontward of the vehicle and road surface roughness frontward of the vehicle from the image of the camera of the vehicle exterior sensor 150. The road surface friction coefficient calculator 210 may acquire an outside air temperature and a road surface temperature from a non-contact thermometer of the vehicle exterior sensor 150.

The road surface friction coefficient calculator 210 may also acquire an amount of moisture on the road surface from a detected value of the near-infrared sensor of the vehicle exterior sensor 150. When the road surface is irradiated with near-infrared rays, an amount of reflected near-infrared rays decreases when the road surface has a large amount of moisture, and the amount of reflected near-infrared rays increases when the road surface has a small amount of moisture. Thus, the road surface friction coefficient calculator 210 is able to acquire the amount of moisture on the road surface on the basis of the detected value of the near-infrared sensor.

The road surface friction coefficient calculator 210 may acquire the road surface roughness from the laser light sensor of the vehicle exterior sensor 150. In one more specific but non-limiting example, the road surface roughness, or road surface unevenness, frontward of the vehicle may be acquired on the basis of time from sending out of laser light to detection of reflected light. It is to be noted that the road surface friction coefficient calculator 210 may acquire the road surface roughness in a region frontward of the vehicle, in consideration of an amount of movement of the vehicle over the road surface as the vehicle travels, on the basis of a vehicle speed.

Figure 2A:
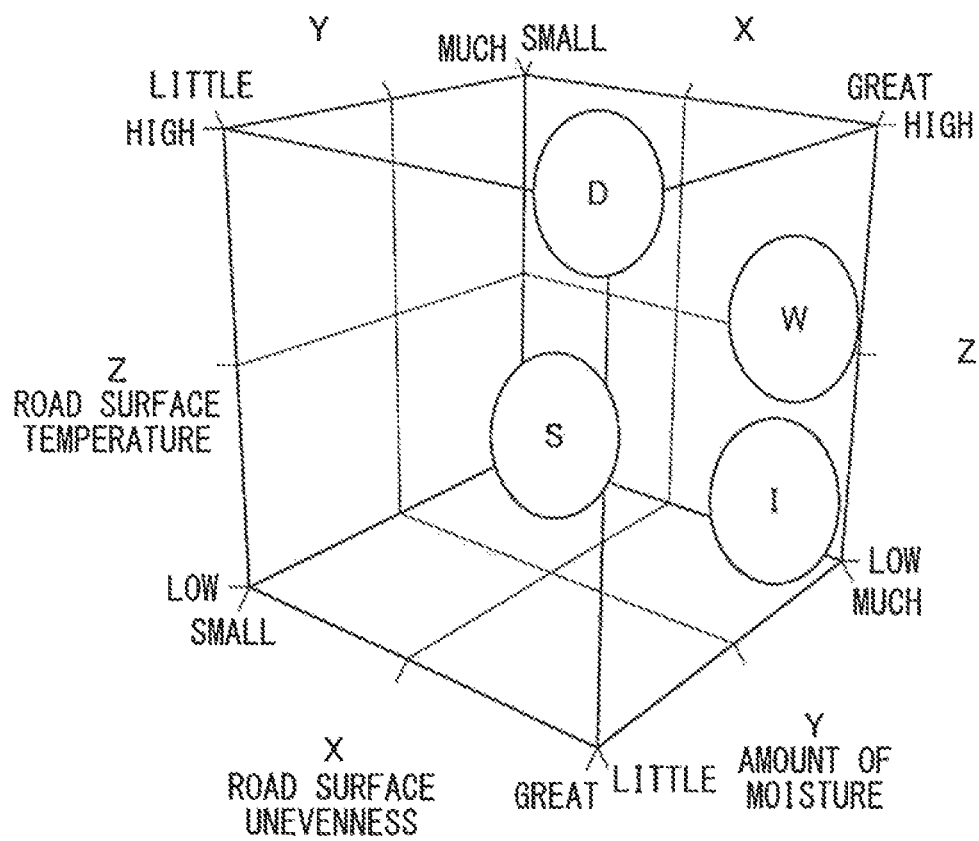
FIG. 2A is a schematic diagram illustrating a map to be used by a road surface friction coefficient calculator in determining a road surface state.
Figure 2B:
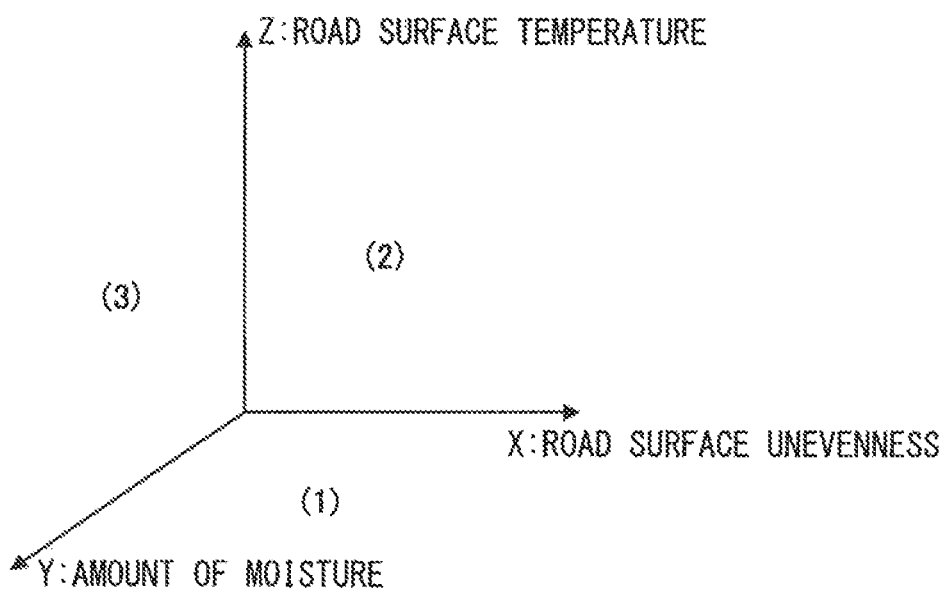
FIG. 2B is a schematic diagram illustrating a coordinate system of the three-dimensional map in FIG. 2A.
Figure 2C:
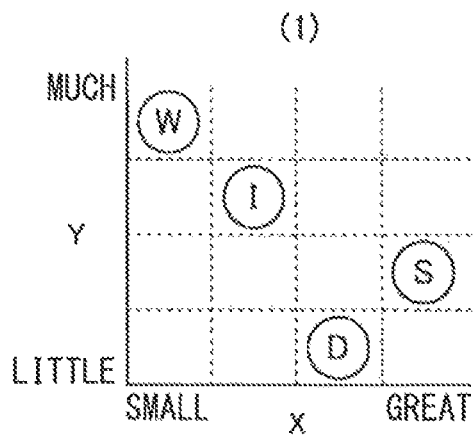
FIG. 2C is a schematic diagram illustrating a two-dimensional map into which the three-dimensional map in FIG. 2A is decomposed.
Figure 2D:
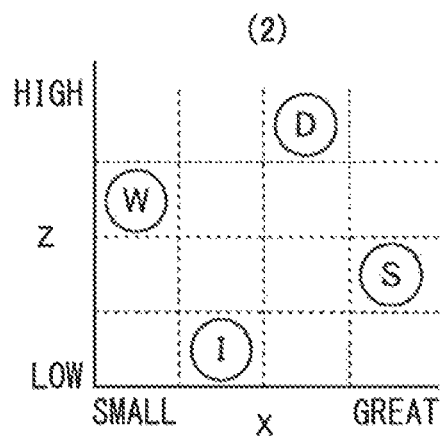
FIG. 2D is a schematic diagram illustrating a two-dimensional map into which the three-dimensional map in FIG. 2A is decomposed.
Figure 2E:
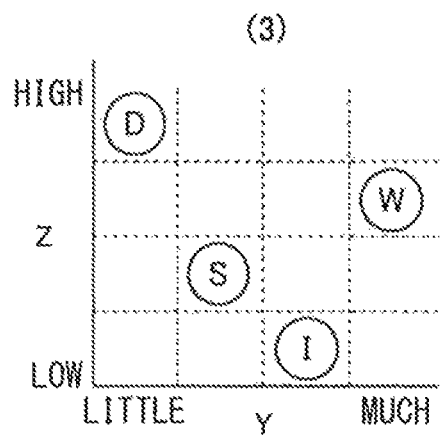
FIG. 2E is a schematic diagram illustrating a two-dimensional map into which the three-dimensional map in FIG. 2A is decomposed.

The road surface friction coefficient calculator 210 may determine, from these pieces of data acquired from the vehicle exterior sensor 150, which the road surface state is, dry (D), wet (W), snow (S), or ice (I). FIG. 2A is a schematic diagram illustrating a map to be used by the road surface friction coefficient calculator 210 in determining the road surface state. The map illustrated in FIG. 2A is a three-dimensional map, with normalized values of the road surface temperature, the road surface unevenness, and the amount of moisture on the road surface serving as parameters. FIG. 2B to FIG. 2E are schematic diagrams illustrating the three-dimensional map in FIG. 2A decomposed into two-dimensional maps. FIG. 2B illustrates a coordinate system of the road surface temperature (Z axis), the road surface unevenness (X axis), and the amount of moisture on the road surface (Y axis). FIG. 2C illustrates a two-dimensional map of a plane (1) in FIG. 2B. FIG. 2D illustrates a two-dimensional map of a plane (2) in FIG. 2B. FIG. 2E illustrates a two-dimensional map of a plane (3) in FIG. 2B. The road surface friction coefficient calculator 210 may apply the road surface temperature, the road surface unevenness, and the amount of moisture on the road surface acquired from the detection values by the vehicle exterior sensor 150 to the map in FIG. 2A to determine the road surface state.

The road surface friction coefficient calculator 210 may calculate the coefficient of friction μN on the road surface by reflecting the road surface state determined from the map in FIG. 2A onto a database that defines, in advance, relation of road surface conditions and the coefficient of friction on the road surface. FIG. 3 is a schematic diagram illustrating an example of the database that defines, in advance, the relation of the road surface conditions and the coefficient of friction. The road surface conditions as used here may include the road surface states illustrated in FIG. 2A, e.g., dry (D), wet (W), snow (S), and ice (I), and paving states, e.g., asphalt, concrete, and gravel. In the database illustrated in FIG. 3, summarized vertically are values of the coefficient of friction corresponding to the following road surface conditions: "asphalt", "concrete", "gravel", "ice" and "snow". Summarized laterally are values of the coefficient of friction corresponding to the following road surface conditions: "dry (D)" and "wet (W)".

The road surface friction coefficient calculator 210 may apply the road surface state determined from the map in FIG. 2A to the database in FIG. 3, and thereby calculate the coefficient of friction μN on the road surface. At this occasion, a determination may be made as to which the road surface frontward of the vehicle includes, "asphalt", "concrete", "gravel", "ice" or "snow" on the basis of a result of a determination on similarity between an image of the road surface acquired from the camera of the vehicle exterior sensor 150 and images of "asphalt", "concrete", "gravel", "ice" and "snow" acquired in advance.

Further, in a case with a determination that the road surface frontward of the vehicle includes "asphalt", the road surface friction coefficient calculator 210 may determine which the road surface frontward of the vehicle includes, "new paving" of "asphalt", "normal paving" of "asphalt", "abrased paving" of "asphalt", or "asphalt" in "excess of tar", on the basis of a result of a determination on similarity between the image of the road surface acquired from the camera of the vehicle exterior sensor 150 and images of "new paving", "normal paving", "abrased paving" and "excess of tar" acquired in advance. Likewise, the road surface friction coefficient calculator 210 is able to make a more subdivided determination, in a case with a determination that the road surface frontward of the vehicle includes "concrete", "gravel", "ice" or "snow".

As described above, the road surface friction coefficient calculator 210 may calculate a coefficient of friction μf on the road surface frontward of the vehicle from the database in FIG. 3 on the basis of the road surface conditions and the vehicle speed. For example, in a case with a determination from the image of the camera of the vehicle exterior sensor 150 that the road surface includes "new paving" of "asphalt", with the vehicle speed detected from the vehicle speed sensor 170 being 40 km/h, and with a determination from the map in FIG. 2A that the road surface state is dry (D), a value of the coefficient of friction μf on the road surface is calculated as ranging from 0.82 to 1.02 both inclusive.

The past data acquirer 214 may acquire various pieces of data by communicating with the server 2000 through the communication device 800. The past data acquirer 214 may acquire the proposed route from the navigation device 700, and obtain, from the server 2000, various pieces of data regarding the proposed route. Non-limiting examples of the data to be acquired by the past data acquirer 214 from the server 2000 may include data such as weather, an air temperature, wind force, and the road surface state in the proposed route. The server 2000 may communicate with a plurality of vehicles to accumulate, in advance, data such as weather, an air temperature, wind force, and the road surface state corresponding to the respective positions of the plurality of the vehicles as communication partners, and hold the data in the database 2010.

Figure 4:
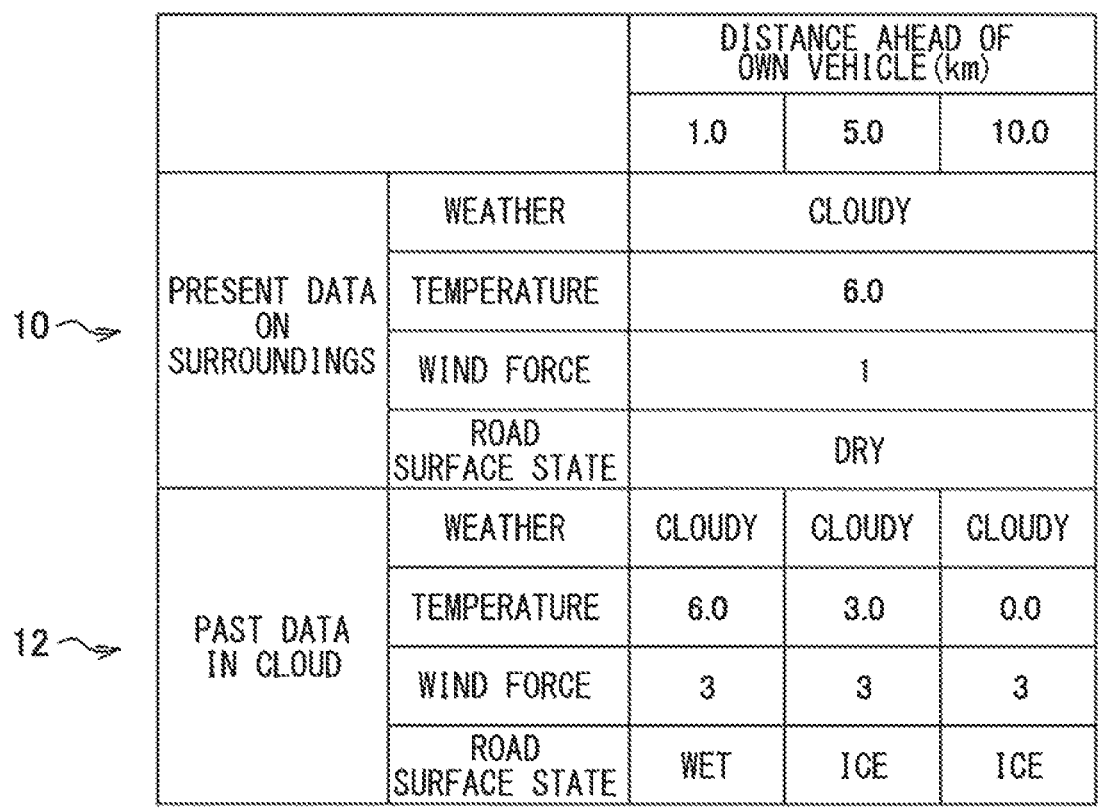
FIG. 4 summarizes data acquired by a behavior instability acquirer.

FIG. 4 summarizes data acquired by the behavior instability acquirer 202. Among the data summarized in FIG. 4, present data on surroundings 10 may be acquired by the present surrounding environment data acquirer 212. Past data in a cloud 12 may be acquired by the past data acquirer 214. It is to be noted that in FIG. 4, the values of the coefficient of friction on the road surface calculated by the road surface friction coefficient calculator 210 are omitted. As illustrated in FIG. 4, as the past data in the cloud 12, data at distances 1.0 kilometer, 5.0 kilometers, and 10.0 kilometers ahead of the vehicle along the proposed route may be acquired from the server 2000.

The automated driving advisability determination unit 220 may determine whether to continue the automated driving on the basis of the data acquired by the behavior instability acquirer 202. In one specific but non-limiting example, the automated driving advisability determination unit 220 may determine, on the basis of the present data on the surroundings 10 and the past data in the cloud 12 illustrated in FIG. 4, that the automated driving is noncontinuable in a case where instable vehicle behavior is expected on a route to be traveled by the vehicle in the future. For example, in a case with recognition of light wind based on the present data on the surroundings 10 and recognition of strong wind at a distance of 5.0 kilometers ahead based on the past data in the cloud 12, it is expected that strong wind such as crosswind is blowing on the proposed route ahead. Thus, in a case where environment around the proposed route to be traveled by the vehicle is worse than the surrounding environment around the vehicle, a determination may be made that the automated driving is noncontinuable, and the switching to the manual driving may be made.

The automated driving advisability determination unit 220 may perform scoring of the data illustrated in FIG. 4 to compare the present data on the surroundings 10 with the past data in the cloud 12. FIG. 5 summarizes data obtained by the scoring. Present data on surroundings 20 and past data in a cloud 22 illustrated in FIG. 5 are obtained, respectively, by the scoring of the present data on the surroundings 10 and the past data in the cloud 12 illustrated in FIG. 4.

FIG. 6 schematically illustrates a table to be referred to in the scoring from the data illustrated in FIG. 4 to the data illustrated in FIG. 5. As illustrated in FIG. 6, with respect to, for example, the weather, scores 0, 1, 2, and 3 may be determined respectively for "fine", "cloudy", "rain", and "snow". Likewise, with respect to the wind force, the air temperature, and the road surface state, scores may be determined as summarized in the table in FIG. 6.

A difference 24 between the present and the past illustrated in FIG. 5 represents a difference between the present data on the surroundings 20 and the past data in the cloud 22 obtained by the scoring illustrated in FIG. 5. In addition, automated driving advisability 26 illustrated in FIG. 5 represents results of a determination as to whether to continue the automated driving on the basis of the difference 24 between the present data on the surroundings 20 and the past data in the cloud 22 obtained by the scoring. The results include "continuable" for a case where the automated driving is continuable, and "noncontinuable" for a case where the automated driving is noncontinuable. A determination that the automated driving is noncontinuable may be made if there is any item a value of the difference of which obtained by subtracting the past score from the present score is equal to or smaller than "−2."

In the example illustrated in FIG. 5, the difference 24 between the present data on the surroundings 20 and the past data in the cloud 22 at a distance of 1.0 kilometer ahead of the vehicle is "0" for all items. Therefore, a determination may be made that the automated driving is continuable with respect to the travel over the distance of 1.0 kilometer ahead. Moreover, the difference 24 between the present data on the surroundings 20 and the past data in the cloud 22 at a distance of 5.0 kilometers ahead of the vehicle is "−3" for an item of the road surface state. Therefore, a determination may be made that the automated driving is noncontinuable with respect to the travel over the distance of 5.0 kilometers ahead. Likewise, the difference 24 between the present data on the surroundings 20 and the past data in the cloud 22 at a distance of 10.0 kilometers ahead of the vehicle is "−3" for the item of the road surface state. Therefore, the determination may be also made that the automated driving is noncontinuable with respect to the travel over the distance of 10.0 kilometers ahead.

The vehicle controller 230 may control the vehicle braking and driving device 300 and the steering device 400. The information presentation processor 250 may control the information presentation device 500, in the case with the determination that the automated driving is noncontinuable, to provide the occupant of the vehicle with the presentation of the information that indicates the switching to the manual driving. The driving switching unit 260 may switch, in the case with the determination that the automated driving is noncontinuable, an operation mode from the automated driving to the manual driving.

The switching time setting unit 270 may set, in the case with the determination that the automated driving is noncontinuable, switching time in making the switching from the automated driving to the manual driving. Instantaneous switching from the automated driving to the manual driving would bring about cases where the occupant cannot cope with the manual driving. Further, in terms of processing on the vehicle side, the switching from the automated driving to the manual driving involves a preparation period from a start of the switching to an end of the switching. For example, the switching from the automated driving to the manual driving is assumed to include performing processing of gradually decreasing a ratio of the automated driving while gradually increasing a ratio of the manual driving. The switching time setting unit 270 may set, as the switching time T, time from start timing of the switching from the automated driving to the manual driving, to end timing of the switching to the manual driving. For example, the switching time T may be defined as transition time from a state of the automated driving at the ratio of 100% to a state of the manual driving at the ratio of 100%.

Figures 7, 8:
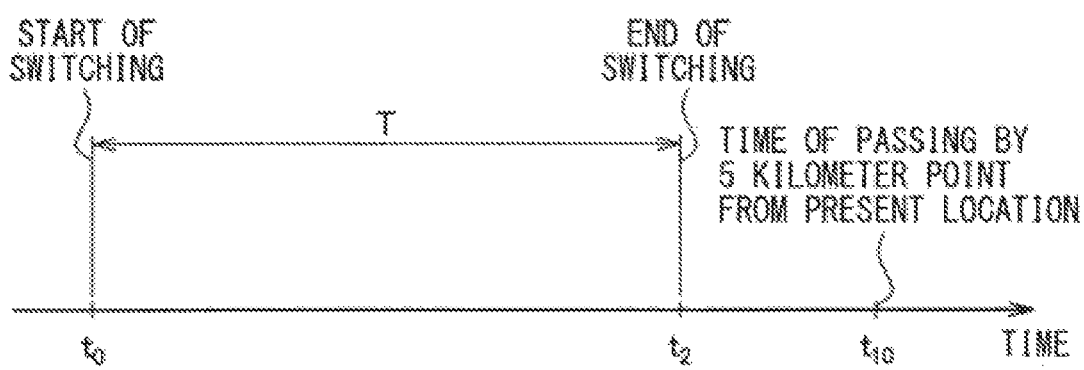
FIG. 7 summarizes values of a coefficient of switching time in accordance with the coefficient of friction.
FIG. 8 is a schematic diagram provided for description of the switching time.

In this embodiment, the switching time T may be set in accordance with the coefficient of friction on the road surface. The switching time T may be set longer as the coefficient of friction on the road surface is lower. FIG. 7 summarizes values of a coefficient of the switching time in accordance with the coefficient of friction on the road surface. The coefficient of the switching time illustrated in FIG. 7 is a value by which predetermined reference time is multiplied. In other words, the switching time T may be calculated by multiplying the reference time by any one of the values of the coefficient of the switching time.

In the switching from the automated driving to the manual driving, there is possibility of some kind of vehicle behavior occurring in response to the switching, e.g., fluctuation of driving torque for a wheel. Accordingly, making the switching from the automated driving to the manual driving, with the coefficient of friction on the road surface being low, is possibly expected to cause temporary instability of the vehicle behavior. In this embodiment, the switching time T may be set longer as the coefficient of friction on the road surface is lower. This makes it possible to change various control amounts from the automated driving to the manual driving over a longer period of time as the coefficient of friction on the road surface is lower. Hence, it is possible to stabilize reliably the vehicle behavior in the switching from the automated driving to the manual driving. Moreover, it is possible to prevent the occupant from feeling uncomfortable at the time of the switching from the automated driving to the manual driving.

FIG. 8 is a schematic diagram provided for description of the switching time T. With a decision given on the switching from the automated driving to the manual driving, the switching to the manual driving may be made while the vehicle travels over a predetermined distance. In one example, the switching to the manual driving may be made before the vehicle travels over the distance of 5 kilometers. For example, in the example of FIG. 5, the determination may be made that the automated driving is continuable with respect to the travel over the distance of 1.0 kilometer ahead, but the automated driving is noncontinuable with respect to the travel over the distance of 5.0 kilometers ahead. Therefore, the switching to the manual driving is assumed to be ended before the vehicle travels over the distance of 5 kilometers.

In FIG. 8, a horizontal axis represents time, and the reference characters "t10" denote scheduled time at which the vehicle passes by a 5 kilometer point from the present location. In this case, the switching to the manual driving may be ended at time t2, i.e., one minute prior to time t10, in anticipation of safety.

Therefore, the switching from the automated driving to the manual driving may be started at time t0 which is earlier than time t2 by the switching time T. This makes it possible to execute, during the switching time T, various processing to be involved in the switching from the automated driving to the manual driving. In a case where the switching time T is changed in accordance with the coefficient of friction on the road surface, time t0 at which the switching from the automated driving to the manual driving is started may be changed in accordance with the switching time T, with time t2 unchanged. This makes it possible to reliably end the switching to the manual driving before the vehicle travels over the distance of 5 kilometers.

It is to be noted that in the example illustrated in FIG. 8, an example is given in which the switching to the manual driving is made, on the basis of a traveling distance of the vehicle, before the vehicle travels over the distance of 5 kilometers. In one alternative, the switching to the manual driving may be made before the vehicle travels for predetermined time, e.g., 3 minutes.

Figure 9:
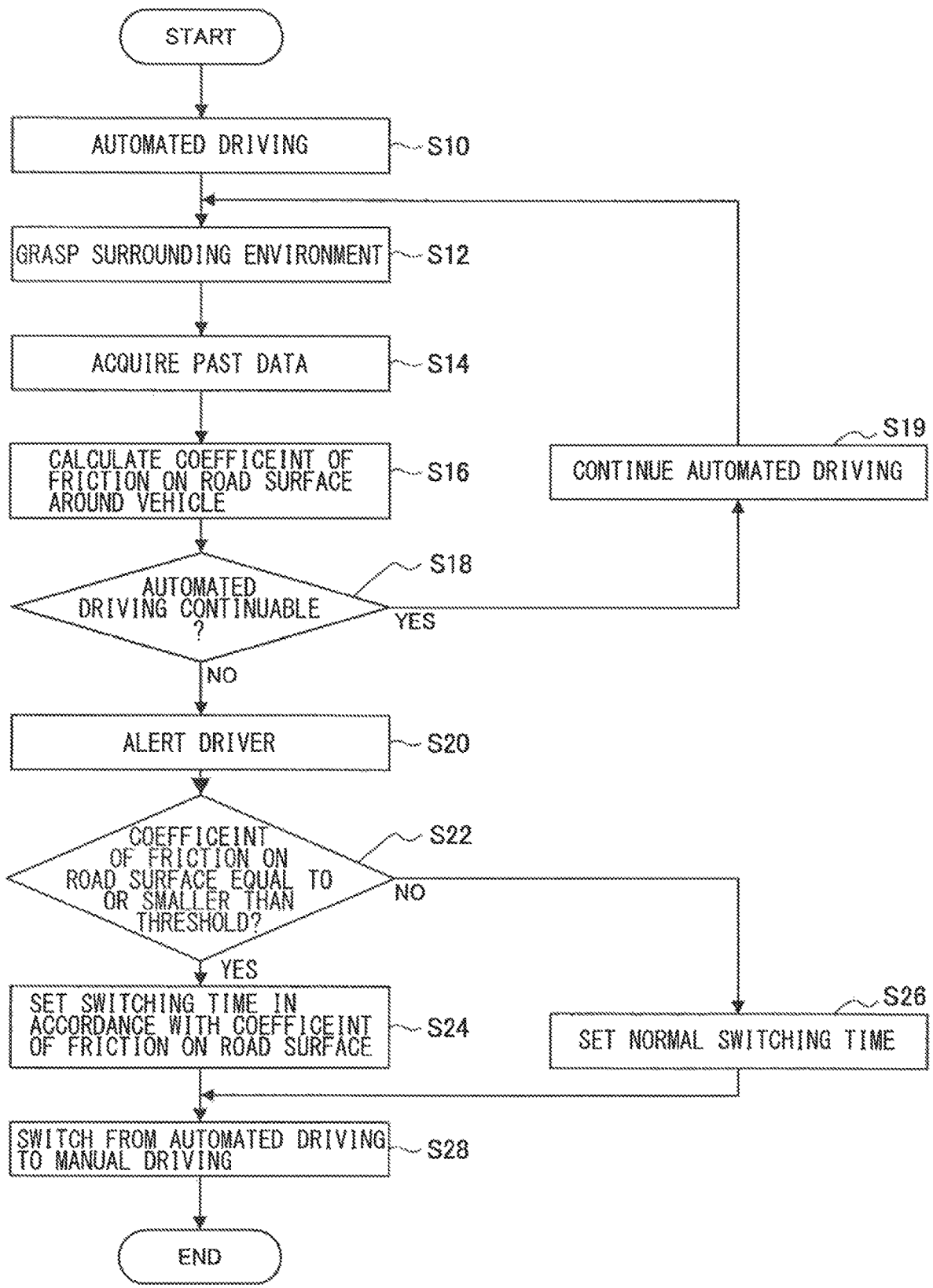
FIG. 9 is a flowchart illustrating processing to be executed in the vehicle system according to the embodiment of the technology.

Described next, with reference to a flowchart of FIG. 9, is processing to be performed in the vehicle system 1000 according to this embodiment. The processing illustrated in FIG. 9 may be performed, mainly by the control device 200, on predetermined cycles. First, in step S10, the vehicle including the vehicle system 1000 may perform the automated driving. The automated driving may be performed by allowing the vehicle controller 230 to control the vehicle braking and driving device 300 and the steering device 400 on the basis of the data detected by the vehicle exterior sensor 150 and the data obtained from the navigation device 700.

Thereafter, in step S12, the vehicle exterior sensor 150 may grasp the surrounding environment and detect the environment data for the calculation of the coefficient of friction on the road surface. Thereafter, in step S14, the past data acquirer 214 may acquire the past data in the cloud 12 from the server 2000. Thereafter, in step S16, the road surface friction coefficient calculator 210 may calculate the coefficient of friction on the road surface around the vehicle.

Thereafter, in step S18, the automated driving advisability determination unit 220 may determine whether to continue the automated driving. In a case where the automated driving is noncontinuable (step S18: NO), the processing may proceed to step S20. In step S20, the occupant of the vehicle may be notified of an alert to the switching to the manual driving, that is, unautomated driving. The alert may be given by the information presentation processor 250 issuing a command to the information presentation device 500. At the time of alerting, the information regarding the switching time T may be presented to the occupant. This makes it possible for the occupant of the vehicle to recognize time until the end of the switching to the manual driving. Meanwhile, in step S18, in a case where the automated driving is continuable (step S18: YES), the processing may proceed to step S19. In step S19, the automated driving is continued. After step S19, the processing may return to step S12.

After step S20, the processing may proceed to step S22. In step S22, a determination may be made as to whether the coefficient of friction on the road surface calculated by the road surface friction coefficient calculator 210 is equal to or smaller than a predetermined threshold. In a case where the coefficient of friction on the road surface is equal to or smaller than the predetermined threshold (step S22: YES), the processing may proceed to step S24. In step S24, the switching time T in accordance with the coefficient of friction on the road surface may be set.

Meanwhile, in step S22, in a case where the coefficient of friction on the road surface is greater than the predetermined threshold (step S22: NO), the processing may proceed to step S26. In step S26, the switching time T may be set at normal time, or the reference time.

After steps S24 and S26, the processing may proceed to step S28. In step S28, the switching from the automated driving to the manual driving may be made on the basis of the switching time T set in steps S24 and S26.

It is to be noted that in the forgoing processing, an example is given in which the switching time T may be set on the basis of the coefficient of friction on the road surface calculated by the road surface friction coefficient calculator 210. The switching time T, however, may be set using other data than the coefficient of friction on the road surface. In one example, the switching time T may be set on the basis of data indicating the behavior instability of the vehicle. That is, the switching time T may be set on the basis of a broad range of data acquired by the behavior instability acquirer 202, for example, on the basis of the present data on the surroundings 10 or the past data in the cloud 12, or both. In this case as well, the switching time T may be made longer as the behavior instability is higher. This makes it possible to stabilize the vehicle behavior at the time of the switching from the automated driving to the manual driving, and to prevent the occupant from feeling uncomfortable.

Moreover, in the forgoing processing, described is the switching time from the automated driving to the manual driving. Likewise, switching time from the manual driving to the automated driving may be also set in accordance with the behavior instability.

As described, according to this embodiment, the switching time from the automated driving to the manual driving is set in accordance with the behavior instability of the vehicle. Hence, it is possible to stabilize the vehicle behavior in making the switching from the automated driving to the manual driving and vice versa.

The control device 200 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control device 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control device 200 illustrated in FIG. 1.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control device, comprising:
a behavior instability acquirer configured to acquire behavior instability of a vehicle, the behavior instability acquirer comprising a calculator configured to calculate a coefficient of friction on a road surface to be traveled by the vehicle;
an automated driving advisability determination unit configured to determine whether the automated driving is continuable on a condition that the vehicle is performing the automated driving; and
a switching time setting unit configured to determine a switching time from the automated driving to manual driving on a basis of the behavior instability, in response to the automated driving advisability determination unit determining that the automated driving is noncontinuable, wherein:
a switching from the automated driving to the manual driving is performed by simultaneously and gradually decreasing a ratio of the automated driving while gradually increasing a ratio of the manual driving during the determined switching time,
the switching time is a transition period indicating a start and an end of the switching, the switching time being from:
a timing at which the gradually decreasing of the ratio of the automated driving starts at a state of the automated driving being at a ratio of 100% relative to the manual driving, to
a timing at which the gradually decreasing of the ratio of the automated driving stops at a state of the manual driving being at a ratio of 100% relative to the automated driving, and
the switching time setting unit is configured to set the switching time so that the switching time becomes longer as the calculated coefficient of friction becomes lower.

2. The vehicle control device according to claim 1, wherein
the behavior instability acquirer includes a present surrounding environment data acquirer configured to acquire data regarding surrounding environment around the vehicle, the data regarding the surrounding environment including a state of a road surface to be traveled by the vehicle, and
the behavior instability is derived from the state of the road surface to be traveled by the vehicle.

3. The vehicle control device according to claim 2, wherein
the behavior instability acquirer further includes a past data acquirer configured to acquire, from a server, data regarding environment around a proposed route to be traveled by the vehicle, and
the automated driving advisability determination unit determines whether to continue the automated driving on a basis of the data regarding the surrounding environment around the vehicle acquired by the present surrounding environment data acquirer and on a basis of the data regarding the environment around the proposed route acquired by the past data acquirer.

4. The vehicle control device according to claim 3, wherein the automated driving advisability determination unit determines that the automated driving is noncontinuable on a condition that the environment around the proposed route to be traveled by the vehicle is worse than the surrounding environment around the vehicle.

5. The vehicle control device according to claim 1, wherein the automated driving advisability determination unit alerts an occupant of the vehicle to switching to the manual driving on the condition that the automated driving advisability determination unit determines that the automated driving is noncontinuable.

6. The vehicle control device according to claim 1, wherein the switching time comprises time from a start of switching from the automated driving to the manual driving, to an end of the switching to the manual driving.

7. A vehicle control method, comprising:
acquiring behavior instability of a vehicle on a basis of data detected by a sensor;
calculating a coefficient of friction on a road surface to be traveled by the vehicle;

determining whether the automated driving is continuable on a condition that the vehicle is performing the automated driving; and determining a switching time from the automated driving to manual driving on a basis of the behavior instability, in response to a determination is made that the automated driving is noncontinuable, wherein a switching from the automated driving to the manual driving is performed by gradually decreasing a ratio of the automated driving while simultaneously and gradually increasing a ratio of the manual driving during the determined switching time, the switching time is a transition period indicating a start and an end of the switching, the switching time being from:

a timing at which the gradually decreasing of the ratio of the automated driving starts at a state of the automated driving being at a ratio of 100% relative to the manual driving, to a timing at which the gradually decreasing of the ratio of the automated driving stops at a state of the manual driving being at a ratio of 100% relative to the automated driving, and setting the switching time so that the switching time becomes longer as the calculated coefficient of friction becomes lower.

8. The vehicle control method according to claim 7, wherein the determination that the automated driving is noncontinuable is made on a condition that environment around a proposed route to be traveled by the vehicle is worse than surrounding environment around the vehicle.

9. A vehicle control system, comprising:

a vehicle control device; and a server configured to accumulate data regarding environment around a proposed route to be traveled by a vehicle and provide the vehicle control device with the data regarding the environment around the proposed route, the vehicle control device including a behavior instability acquirer configured to acquire behavior instability of the vehicle, the behavior instability acquirer comprising a calculator configured to calculate a coefficient of friction on a road surface to be traveled by the vehicle, an automated driving advisability determination unit configured to determine whether the automated driving is continuable on a basis of data regarding surrounding environment around the vehicle and on a basis of the data regarding the environment around the proposed route, and a switching time setting unit configured to determine a switching time from the automated driving to manual driving on a basis of the behavior instability, in response to the automated driving advisability determination unit determining that the automated driving is noncontinuable, wherein a switching from the automated driving to the manual driving is performed by gradually decreasing a ratio of the automated driving while simultaneously and gradually increasing a ratio of the manual driving during the determined switching time, the switching time is a transition period indicating a start and an end of the switching, the switching time being from:

a timing at which the gradually decreasing of the ratio of the automated driving starts at a state of the automated driving being at a ratio of 100% relative to the manual driving, to a timing at which the gradually decreasing of the ratio of the automated driving stops at a state of the manual driving being at a ratio of 100% relative to the automated driving, and the switching time setting unit is configured to set the switching time so that the switching time becomes longer as the calculated coefficient of friction becomes lower.

10. The vehicle control system according to claim 9, wherein the automated driving advisability determination unit determines that the automated driving is noncontinuable on a condition that the environment around the proposed route to be traveled by the vehicle is worse than the surrounding environment around the vehicle.

\* \* \* \* \*